(12) United States Patent
Gohari et al.

(10) Patent No.: US 10,194,337 B2
(45) Date of Patent: Jan. 29, 2019

(54) METHODS AND APPARATUS FOR OFFLOADING CHECKSUM PROCESSING

(71) Applicant: QUALCOMM Incorporated, San Diego, CA (US)

(72) Inventors: Amir Aminzadeh Gohari, San Diego, CA (US); Shailesh Maheshwari, San Diego, CA (US); Sandeep Urgaonkar, San Diego, CA (US); Alok Mitra, San Diego, CA (US); Mohammed M. Rumi, San Diego, CA (US); Vaibhav Kumar, San Diego, CA (US); Uppinder Singh Babbar, San Diego, CA (US); Thomas Klingenbrunn, San Diego, CA (US); Bao Vinh Nguyen, Corona, CA (US); Mathias Kohlenz, San Diego, CA (US); Gautam Sheoran, San Diego, CA (US); Daisuke Terasawa, San Diego, CA (US); Iain Finlay, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 13/940,009

(22) Filed: Jul. 11, 2013

(65) Prior Publication Data
US 2014/0016550 A1   Jan. 16, 2014

Related U.S. Application Data

(60) Provisional application No. 61/670,983, filed on Jul. 12, 2012, provisional application No. 61/672,234, filed on Jul. 16, 2012.

(51) Int. Cl.
*H04L 1/00* (2006.01)
*H04W 24/02* (2009.01)

(52) U.S. Cl.
CPC ........... *H04W 24/02* (2013.01); *H04L 1/0052* (2013.01); *H04L 1/0061* (2013.01)

(58) Field of Classification Search
CPC .................................................... H04W 24/02
See application file for complete search history.

(56) References Cited

U.S. PATENT DOCUMENTS

| | | | |
|---|---|---|---|
| 5,898,713 A * | 4/1999 | Melzer et al. | 714/807 |
| 6,530,061 B1 | 3/2003 | Labatte | |
| 6,976,205 B1 * | 12/2005 | Ziai et al. | 714/807 |
| 7,606,166 B2 | 10/2009 | Basso et al. | |
| 7,660,264 B1 | 2/2010 | Eiriksson et al. | |
| 2003/0097481 A1* | 5/2003 | Richter | 709/251 |
| 2004/0158640 A1 | 8/2004 | Philbrick et al. | |
| 2006/0039468 A1* | 2/2006 | Emerson et al. | 375/240.01 |

(Continued)

OTHER PUBLICATIONS

International Search Report and Written Opinion—PCT/US2013/050181—ISAEPO—dated Sep. 5, 2013.

*Primary Examiner* — Benjamin Lamont
(74) *Attorney, Agent, or Firm* — Patterson & Sheridan, L.L.P.

(57) ABSTRACT

Aspects of the present disclosure provide methods and apparatus for offloading checksum processing in a user equipment (UE) (e.g., from an application processor to a modem processor). Such offloading may speed up packet processing, increase data rate, and/or free up resources of the application processor for other tasks.

84 Claims, 8 Drawing Sheets

(56) References Cited

U.S. PATENT DOCUMENTS

| | | | |
|---|---|---|---|
| 2006/0227804 A1 | 10/2006 | Gonzalez et al. | |
| 2008/0183901 A1 | 7/2008 | Cardona et al. | |
| 2008/0244361 A1* | 10/2008 | Walma | 714/758 |
| 2008/0279219 A1* | 11/2008 | Wu et al. | 370/474 |
| 2009/0006921 A1* | 1/2009 | Engberg | 714/752 |
| 2010/0095193 A1* | 4/2010 | Moltchanov et al. | 714/807 |
| 2013/0346628 A1* | 12/2013 | Canion et al. | 709/245 |
| 2014/0280857 A1* | 9/2014 | Yang et al. | 709/223 |

* cited by examiner

METHODS AND APPARATUS FOR OFFLOADING CHECKSUM PROCESSING

CROSS-REFERENCE TO RELATED APPLICATIONS

The present application for patent claims priority to U.S. Provisional Application Nos. 61/670,983, filed Jul. 12, 2012, and 61/672,234, filed Jul. 16, 2012, both of which are assigned to the assignee of the present application and hereby expressly incorporated by reference herein in their entirety.

FIELD

Certain aspects of the present disclosure generally relate to methods and apparatus for offloading checksum processing.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3$^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

SUMMARY

Certain aspects of the present disclosure provide a method for wireless communications with checksum offloading to a modem processor. The method generally includes exchanging, by a modem processor, uplink and downlink packets with an application processor and performing, by the modem processor, at least partial checksum processing for at least one of the uplink or downlink packets based on a configuration.

Certain aspects of the present disclosure provide a method for wireless communications with checksum offloading to a modem processor. The method generally includes configuring a modem processor to perform at least partial checksum processing for packets and exchanging uplink and downlink packets with the modem processor, wherein the modem processor performs at least partial checksum processing for at least one of the uplink or downlink packets based on the configuration.

Certain aspects of the present disclosure provide a method of wireless communication by a user equipment (UE). The method generally includes configuring a modem processor to perform at least partial checksum processing for packets, exchanging uplink and downlink packets between the application processor and the modem processor, and performing, with the modem processor, at least partial checksum processing for at least one of the uplink or downlink packets with the modem processor based on the configuration.

Numerous other aspects are provided including apparatus, systems and computer program products.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
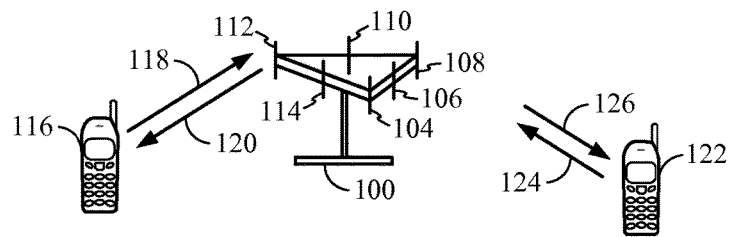
FIG. 1 illustrates an example multiple access wireless communication system in accordance with certain aspects of the present disclosure.

Aspects of the present disclosure provide methods and apparatus for offloading checksum processing from an application processor to a modem processor. Such offloading, as described herein, may speed up packet processing, increase data rate, and/or free up resources of the application processor, both of which may help improve overall performance of a user equipment (UE).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
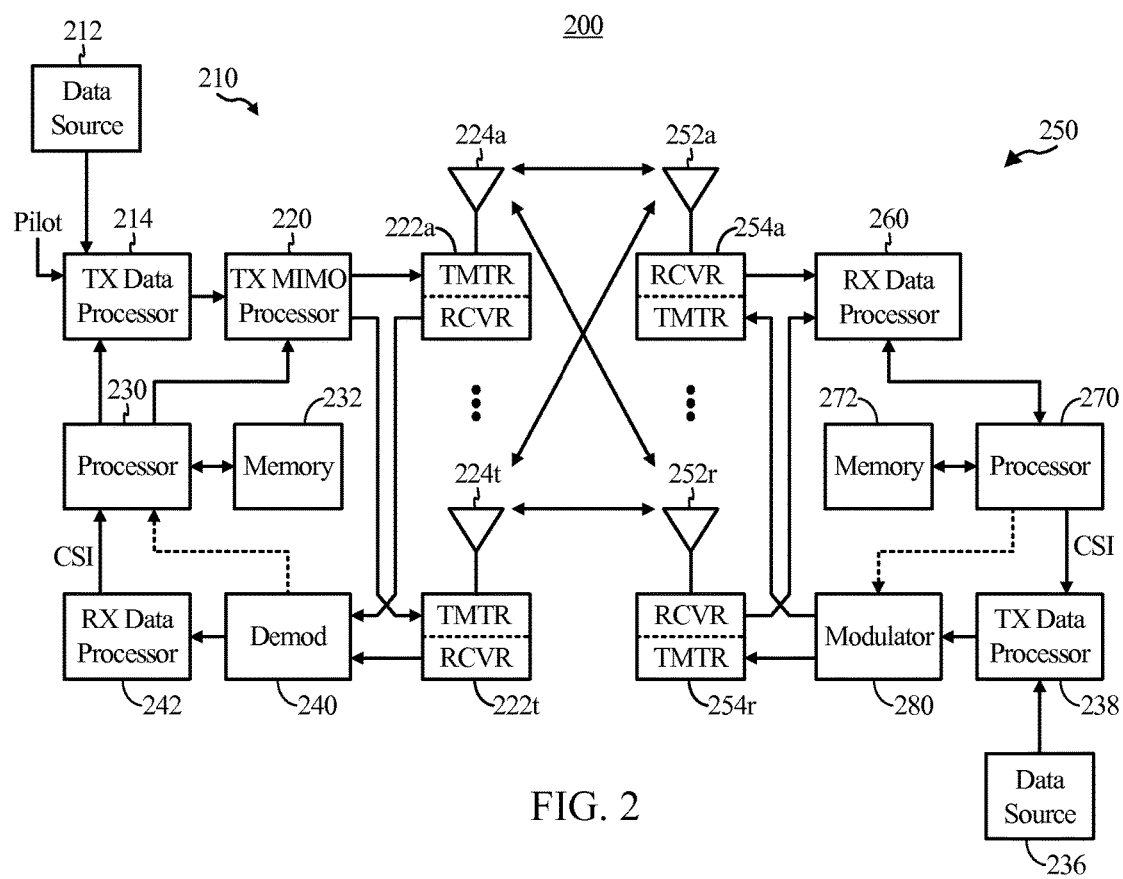
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
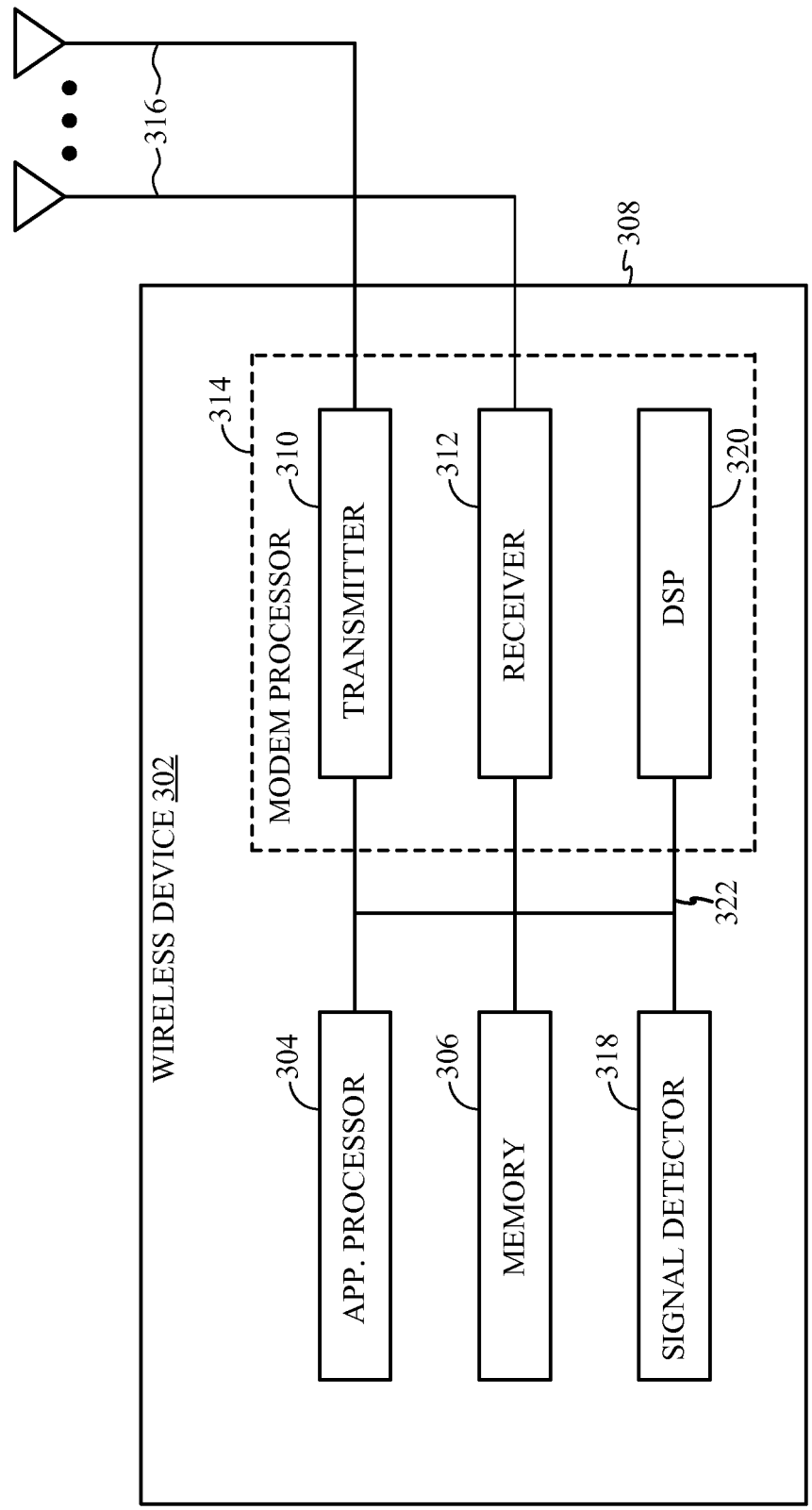
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122. However, the present methods and apparatus may be employed by any communications device.

The wireless device 302 may include one or more processors 304 that controls operation of the wireless device 302. The one or more processors 304 may also be referred to as a central processing units (CPUs). Memory 306, which may include both read-only memory (ROM) and random access memory (RAM), provides instructions and data to the processor 304. A portion of the memory 306 may also include non-volatile random access memory (NVRAM). The one or more processors 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver. A single or a plurality of transmit antennas 316 may be attached to the housing 308 and electrically coupled to the transceiver. The wireless device 302 may also include (not shown) multiple transmitters, multiple receivers, and multiple transceivers.

The wireless device 302 may also include a signal detector 318 that may be used in an effort to detect and quantify the level of signals received by the transceiver. The signal detector 318 may detect such signals as total energy, energy per subcarrier per symbol, power spectral density and other signals. The wireless device 302 may also include a digital signal processor (DSP) 320 for use in processing signals.

The one or more processors 304 may comprise an application processor 304 that communicates with a modem processor 314. As illustrated, the modem processor 314 may include various components to handle radio functions, such as transmitter 310, receiver 312, and DSP 320. As will be described in greater detail below, according to certain aspects, checksum processing may be offloaded to modem processor 314.

The various components of the wireless device 302 may be coupled together by a bus system 322, which may include a power bus, a control signal bus, and a status signal bus in addition to a data bus.

Example Offloading of Checksum Processing

Aspects of the present disclosure provide techniques for offloading checksum processing from an application processor to a modem processor. As used herein, the term modem processor (e.g., sometimes referred to as a baseband processor) generally refers to any type of device that manages radio functions of a wireless device (such as a UE for example). A modem processor may, for example, include hardware and/or software (or firmware) to perform signal modulation, encoding, and the like. A modem processor may be a separate component from the application processor but, in some cases, may be located in a same package as the application processor (e.g., as part of a system on a chip).

In any case, offloading checksum processing to a modem processor may speed up packet processing and free up the application processor resources to perform other types of tasks or with the purpose of saving power. The techniques provided herein may be used to offload processing of checksums for any type of packets, such as transmission control protocol (TCP)/user datagram protocol (UDP) packets and, in some cases, may be help provide internet protocol (IP) aggregation support in hardware.

Figure 4A:
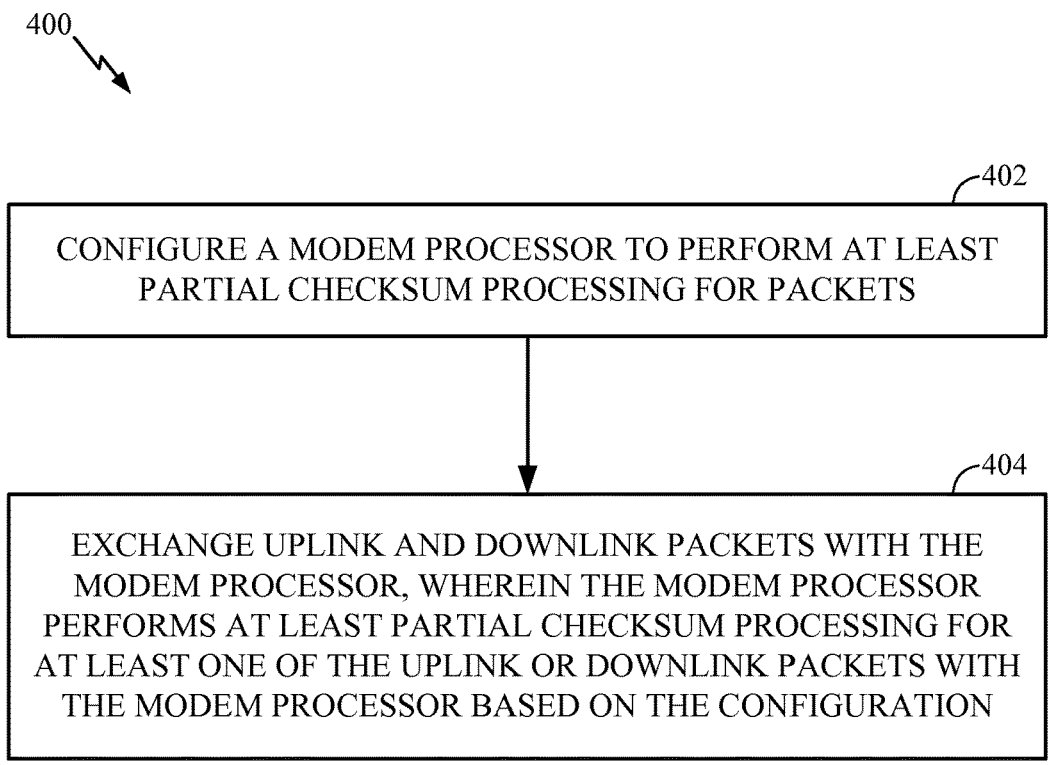
FIGS. 4A and 4B illustrate example operations performed by an application processor and modem processor, respectively, in accordance with aspects of the present disclosure.
Figure 4B:
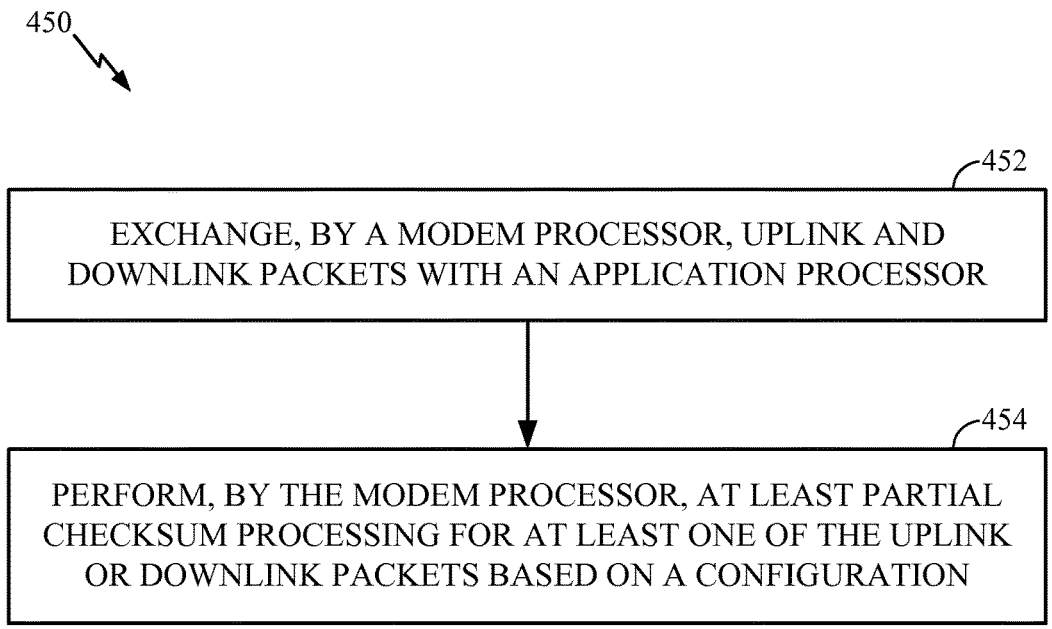

FIGS. 4A and 4B illustrate example operations for checksum offloading, in accordance with aspects of the present disclosure. Operations 400 shown in FIG. 4A may be performed by an application processor while operations 450 may be performed by a modem processor (e.g., and may be considered as complementary to operations 400).

Referring first to FIG. 4A, operations 400 begin, at 402, with the application processor configuring a modem processor to perform at least partial checksum processing for packets. At 404, the application processor exchanges uplink and downlink packets with the modem processor, wherein the modem processor performs at least partial checksum (e.g., via hardware) processing for at least one of the uplink or downlink packets based on the configuration.

Referring next to FIG. 4B, operations 450 begin, at 452, with the modem processor exchanging uplink and downlink packets with an application processor. At 454, the modem processor performs at least partial checksum processing for at least one of the uplink or downlink packets based on a configuration.

In some cases, offloading of checksum processing to the modem processor may be dynamically configured. For example, an application processor may configure checksum offload on a per-packet basis, a per-connection basis (e.g., per PDN connection), a per-destination basis, or based on other IP, TCP or UDP header fields. In some cases, an application processor may configure a checksum offload on a modem before setting up a data call.

The exact operations performed for checksum offloading may be different for downlink packets relative to uplink packets. In the case of downlink packets, the modem processor may perform checksum offloading and provide some type of indication of checksum status (or checksum metadata or other checksum-related data) to the application processor. In the case of uplink packets, the application processor may provide checksum-related data or checksum metadata to the modem processor and the modem processor may perform at least partial checksum processing based on the checksum-related data or checksum metadata.

The particular operations performed for offloading checksum processing may also depend, at least in part, on a type of packet. In general, all TCP packets carry a mandatory checksum field, while UDP over IPv4 packets may have an optional checksum (e.g., which may be a zero value). In general, a transport header (TCP/UDP) checksum for a packet may be calculated over what is referred to as a pseudo header (which is not transmitted with the packet) and an IP payload (e.g., transport header and payload).

Calculating the checksum for the payload (e.g., packet payload) is typically more computationally intensive than calculating the pseudo header. Therefore, in some cases, the modem processor may be configured to perform partial checksum processing based on the packet payload, while the application processor generates the pseudo header (e.g., and a partial checksum therefrom). The pseudo header may be generated over IP header fields and/or an IP payload length. The IP header fields included in a pseudo header generally include a source address, destination address, and a transport protocol.

Figure 5:
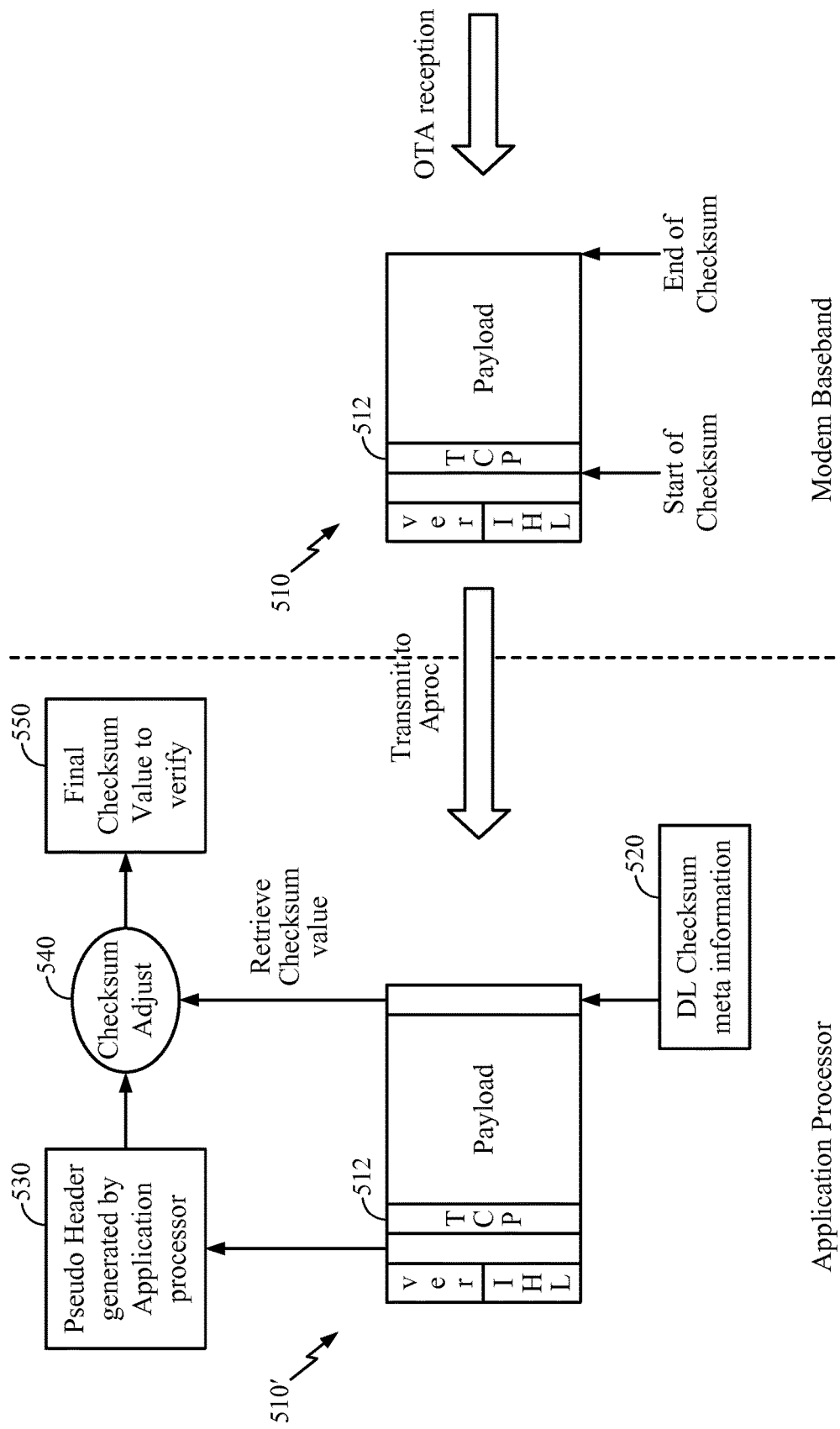
FIG. 5 illustrates an example downlink checksum offloading to a modem processor, in accordance with certain aspects of the present disclosure.

FIG. 5 illustrates an example configuration for downlink checksum offloading in accordance with an aspect. As illustrated, aspects of the present disclosure generally provide a downlink design with a modem/baseband processor configured to perform a checksum calculation over the IP payload (e.g., transport header and payload) of a packet 510 received over the air. The modem processor may be configured to generate meta information (e.g., checksum metadata or checksum-related status) with a computed checksum value per packet, and send it along with the packet to the application processor.

As illustrated, the checksum may be calculated with the transport header checksum 512 in place, but the starting location for the checksum may depend on the type of packet. For IPv4, the start offset may be based on an Internet header length (IHL) field. For IPv6, the start offset may be 40 bytes (e.g., length of a base IPv6 header). As illustrated, the modem processor may forward the application processor a packet 510', which is essentially the received packet 510 with the addition of checksum metadata or checksum-related data 520.

In the illustrated example, the checksum metadata or checksum-related data 520 is appended to the downlink packet but, more generally, the checksum metadata or checksum-related data 520 may be passed to the application processor in any manner. The checksum metadata or checksum-related data 520 may be any type of information allowing the application processor to calculate a final checksum based on a partial checksum calculated by the modem processor and/or perform a final checksum validation. In some cases, the checksum metadata or checksum-related data 520 may include a value of a calculated checksum or partial checksum. In some cases, the checksum metadata or checksum-related data may include an indication (e.g., a flag) of checksum status (e.g., the checksum passed). In some cases, the checksum metadata or checksum-related data may include a value indicating a location within the packet where the modem processor started calculating at least a partial checksum, and/or a length over which the modem processor calculated the at least a partial checksum—thus providing the application processor with sufficient information to identify a remaining portion of the packet over which it should calculate a partial checksum.

As illustrated, for transport protocols requiring pseudo header, the application processor may be configured to generate a pseudo header (at 530) and adjust a checksum value returned by the modem with the pseudo header (at 540). This adjustment may be possible because of the nature of checksums being accumulated sums of separate values-allowing differing partial checksums to be calculated separately and added together. For tunneled IP packets or IPv6 packets with extension headers, the application processor may be configured to adjust a checksum value returned by the modem with an appropriate length of headers (e.g., between first IP header and transport payload). Finally, the application processor may verify the final checksum value (at 550).

Figure 6:
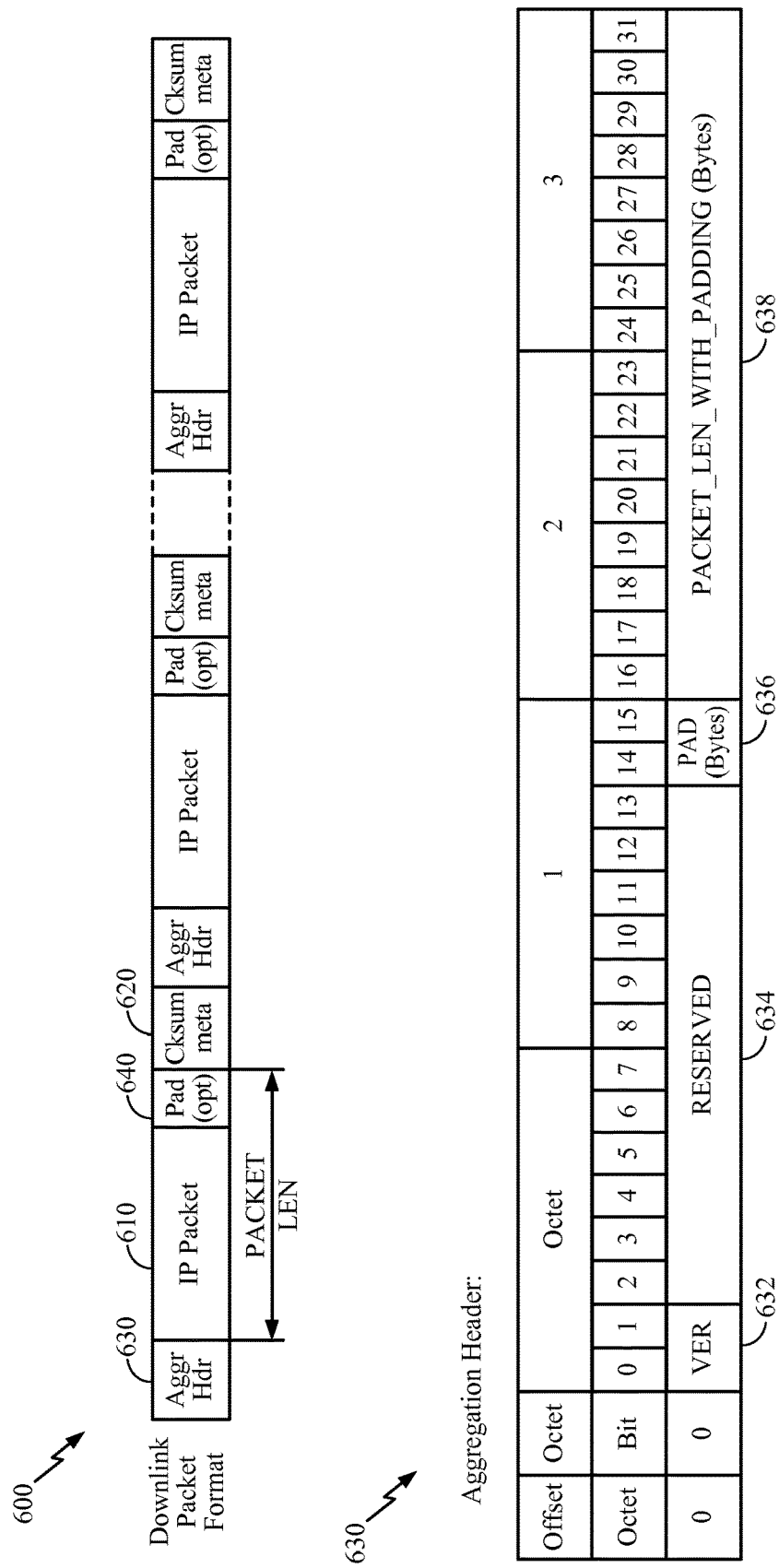
FIG. 6 illustrates an example downlink aggregation header format, in accordance with certain aspects of the present disclosure.

As illustrated in FIG. 6, in some cases, the modem processor may be configured to aggregate downlink packets 610, accumulating several packets and providing them to the application processor as a serial stream 630. In some cases, padding 640 (e.g., of zeros) may be used to align packet lengths—and may be ignored by the application processor. For each aggregated downlink packet 610, checksum metadata or checksum-related data 620 may be provided, along with an aggregation header 630.

In the example format shown, aggregation header 630 has a fixed 4 bytes, with a version field 632 and certain bits 634 reserved and ignored by the receiver. Pad bits 636 may be used to indicate padding number of bytes to achieve aligned packet length. A field 638 may indicate a length of the corresponding packet with padding. The length may be from the start of IP packet 610 to the start of checksum metadata or checksum-related data 620.

Figure 7:
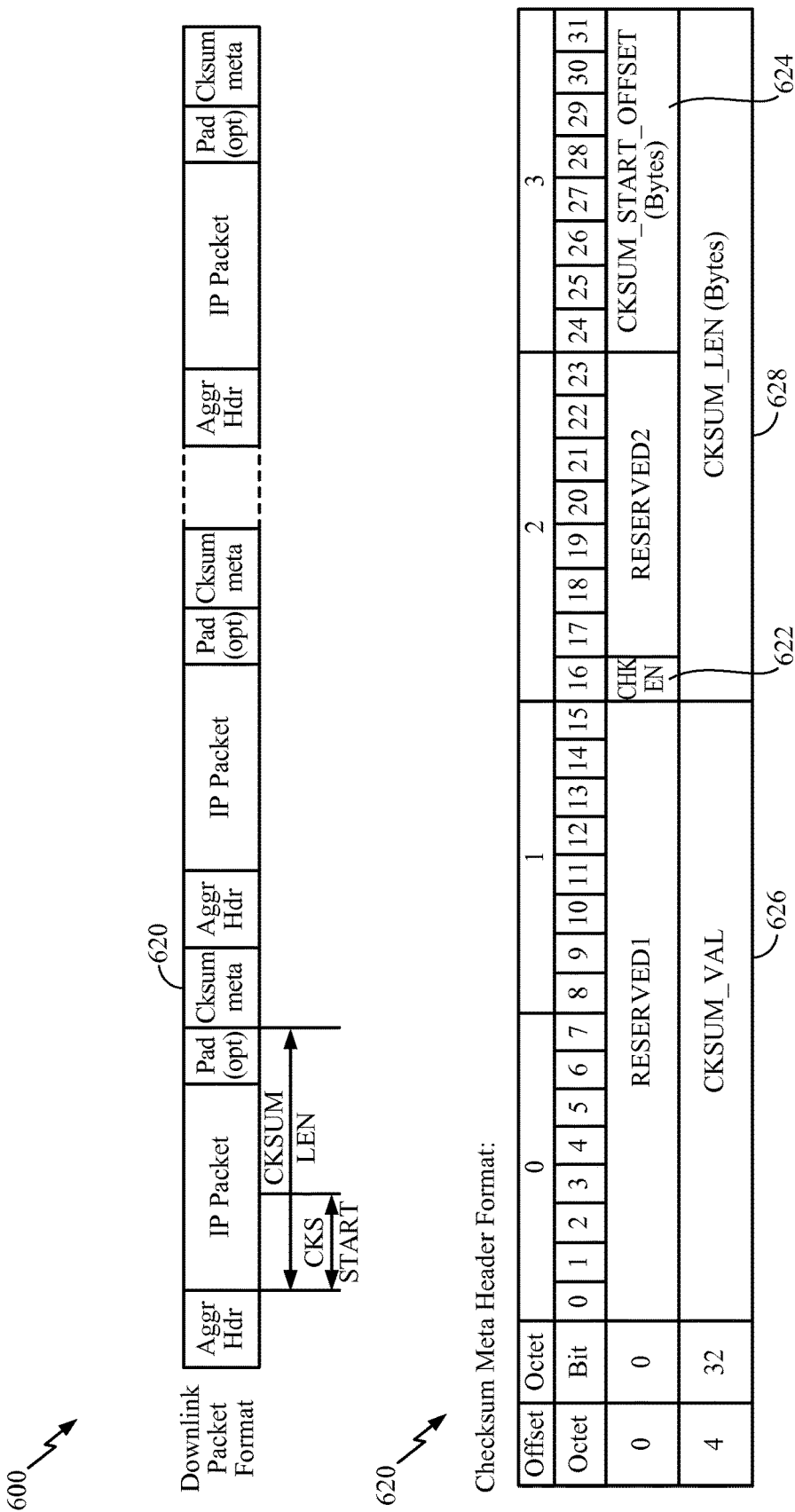
FIG. 7 illustrates an example downlink checksum-related data format, in accordance with certain aspects of the present disclosure.

FIG. 7 illustrates an example format of checksum metadata or checksum-related data 620. In the illustrated example, checksum metadata or checksum-related data 620 is appended, for example, at the end of downlink packets 610 and may include an actual (e.g., whole or partial) checksum value 626 calculated by the modem processor. The checksum metadata or checksum-related data 620 may also include a field 624 indicating an offset in bytes from a start of IP packet where a checksum calculation was started and a field 628 indicating a length over which checksum was calculated (e.g., including padding bytes if any). As noted above, these field may allow the application processor to compute a pseudo header and adjust final checksum value before verifying. The metadata 620 or checksum-related data may also include a bit 622 indicating whether or not checksum offloading is enabled for this packet. If this bit indicates checksum offloading is disabled, for example, the application processor may ignore the remaining checksum metadata or checksum-related data 620 and perform the entire checksum processing itself. Although a header including specific fields is described above, a larger or smaller number of and/or different fields may be employed.

Figure 8:
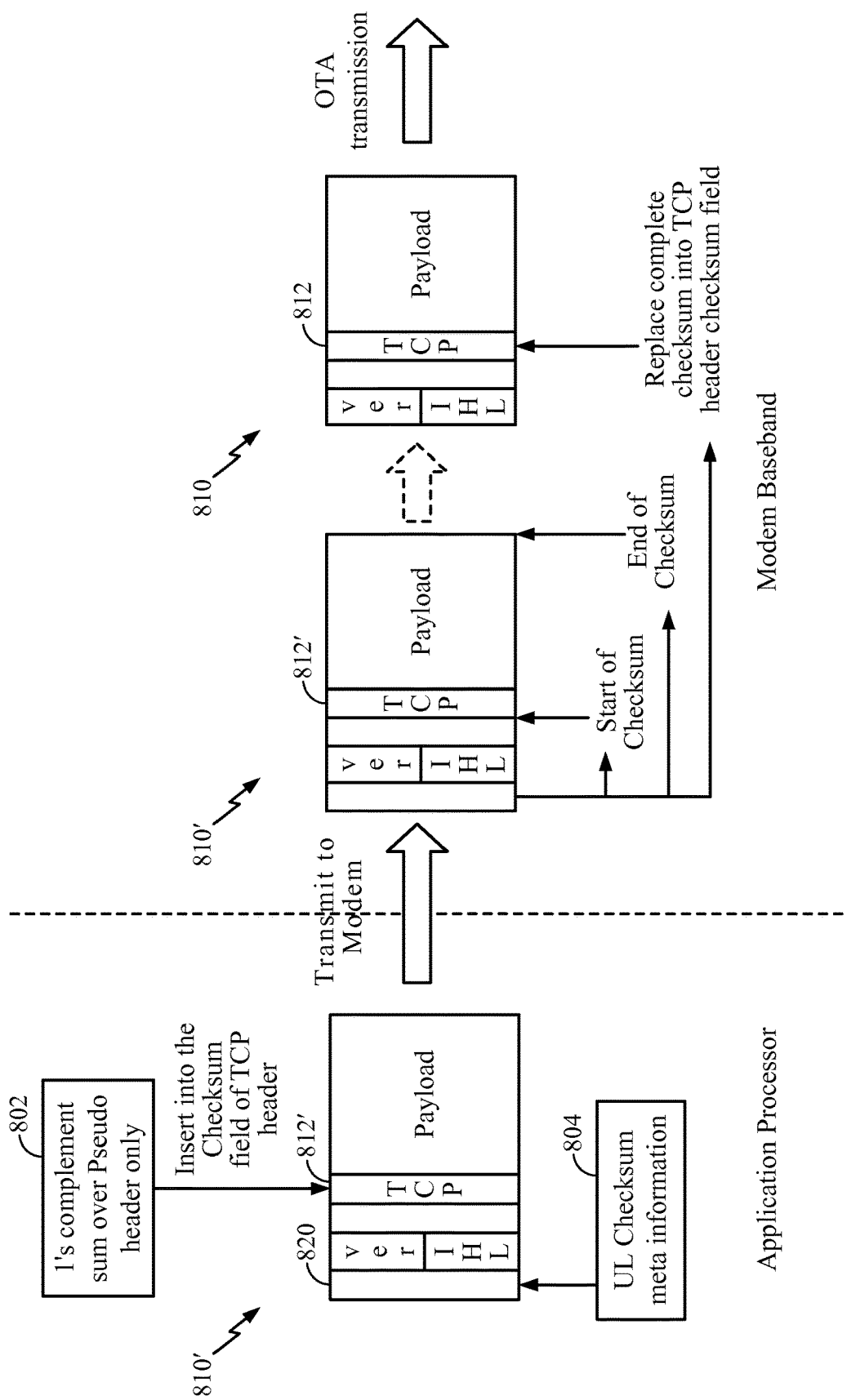
FIG. 8 illustrates an example uplink checksum offloading to a modem processor, in accordance with certain aspects of the present disclosure.

FIG. 8 illustrates an example configuration for uplink checksum offloading in accordance with an aspect. As illustrated, the application processor may generate an uplink packet 810', with uplink checksum metadata or checksum-related data 804 in a header 820 pre-pended, for example, to the packet 810'. According to certain aspects, the application processor may choose to generate a partial checksum based on the pseudo-header (at 802) and insert this partial checksum into TCP header 812'. As illustrated, the application processor may forward to the modem processor the packet 810' for final checksum processing and transmission over the air.

As illustrated, the modem processor may calculate a checksum over the TCP header and payload (e.g., via hardware offload). The start and end location over which the checksum is calculated may be provided as information in the uplink checksum metadata or checksum-related data 820. As illustrated, the modem processor may replace the partial checksum (e.g., calculated by the application processor based on the pseudo-header) with the full checksum in TCP header 812 of the uplink packet 810 prior to transmission over the air.

Figure 9:
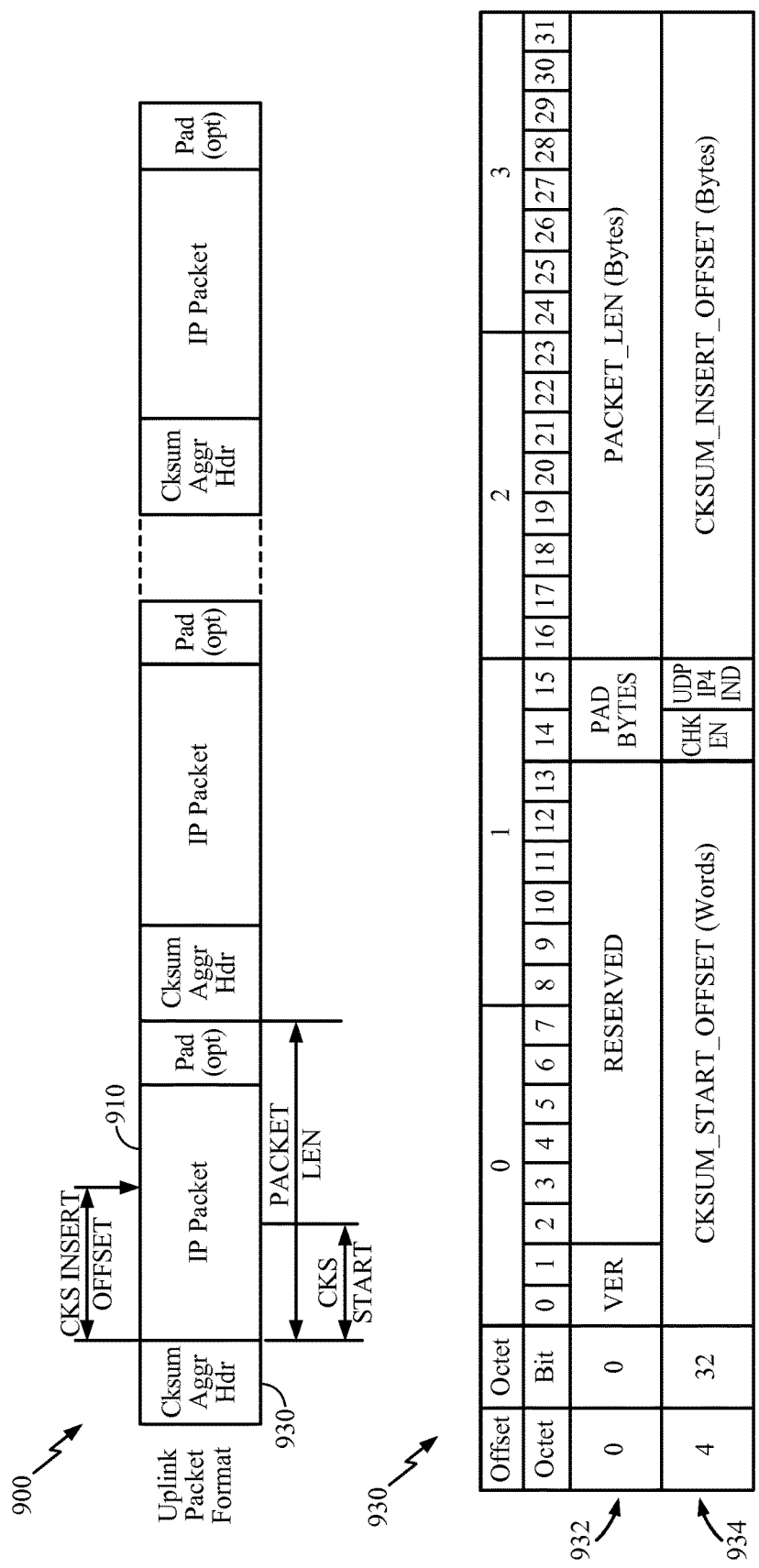
FIG. 9 illustrates an example UL checksum-aggregation header format, in accordance with certain aspects of the present disclosure.

As illustrated in FIG. 9, in some cases, the application processor may be configured to aggregate uplink packets 910, accumulating several uplink packets and providing them to the modem processor as a serial stream 900 in accordance with an aspect. In some cases, padding (e.g., of zeros) may be used to align packet lengths—and may be ignored by the modem processor. For each aggregated uplink packet 910, checksum metadata or checksum-related data 934 and aggregation information 932 may be provided in a single header 930.

In the example format shown, (e.g., checksum/aggregation) header 930 has a fixed 4 bytes and may include a version field and certain reserved bits. Aggregation information 932 may include pad bits used to indicate padding number of bytes to achieve aligned packet length and a field indicating a length of the corresponding packet (e.g., with padding). The uplink checksum metadata or checksum-related data 934 may include a checksum start offset field (e.g., which combined with the packet length field allows the modem processor to determine the size over which it should calculate the checksum). The uplink checksum metadata or checksum-related data 934 may also include a UDP/IPv4 field indicating whether a zero value checksum is valid. The uplink checksum metadata or checksum-related data 934 may also include a checksum insert offset field indicating a position within the TCP field to insert the final checksum.

The uplink checksum metadata or checksum-related data or checksum-related data 934 may also include a bit indicating whether or not checksum offloading is enabled for this packet. If this bit indicates checksum offloading is disabled, for example, the modem processor may ignore the remaining checksum metadata 934 and transmit the corresponding packet, assuming the application processor has performed the full checksum processing. Although a header 930 including specific fields is described above, a larger or smaller number of and/or different fields may be employed.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
   exchanging, by a modem processor of a wireless device, uplink and downlink packets with an application processor of the wireless device, wherein the modem processor manages radio functions of the wireless device;
   performing, by the modem processor, at least partial checksum processing for at least one of the uplink or downlink packets based on a configuration; and
   providing to the application processor checksum metadata comprising one or more values indicating at least one of a location within the at least one of the uplink or downlink packets where the modem processor started the at least partial checksum processing.

2. The method of claim 1, wherein the configuration configures the modem processor to perform the at least partial checksum processing on at least one of: a per-packet basis, a per-connection basis, or a per-destination basis.

3. The method of claim 1, wherein the configuration is provided to the modem processor by the application processor.

4. The method of claim 3, wherein the application processor provides the configuration prior to establishing a data call.

5. The method of claim 1, wherein performing, by the modem processor, at least partial checksum processing for at least one of the uplink or downlink packets based on a configuration includes performing, by the modem processor, at least partial checksum processing for at least one of the uplink or downlink packets based on a configuration using hardware.

6. The method of claim 1, wherein performing the at least partial checksum processing by the modem processor comprises:
calculating at least a partial checksum for a downlink packet received by the wireless device; and
providing the checksum metadata to the application processor based on the calculation.

7. The method of claim 6, wherein exchanging, by a modem processor, uplink and downlink packets with an application processor comprises providing the downlink packet to the application processor.

8. The method of claim 6 wherein the at least a partial checksum is based on an internet protocol payload of the packet.

9. The method of claim 6, wherein:
the checksum metadata comprises a value of the at least a partial checksum based on which the application processor performs a checksum verification using the at least a partial checksum.

10. The method of claim 9, wherein:
the modem processor generates the value of the at least a partial checksum based on an internet protocol (IP) payload of the downlink packet excluding a pseudo header, based on which along with a pseudo header generated by the application processor, the application processor calculates a final checksum.

11. The method of claim 6, wherein:
the one or more values further indicate at least one of a length over which the modem processor calculated the at least a partial checksum or the partial checksum value.

12. The method of claim 6, wherein the modem processor is configured to:
aggregate downlink packets;
perform at least partial checksum processing for each of the aggregated downlink packets; and
provide the checksum metadata to the application processor for each of the aggregated downlink packets based on the at least partial checksum processing performed for each of the aggregated downlink packets.

13. The method of claim 12, wherein performing, by the modem processor, at least partial checksum processing for at least one of the uplink or downlink packets based on a configuration includes performing, by the modem processor, at least partial checksum processing for at least one of the uplink or downlink packets based on one or more values included in an aggregation header associated with the packet.

14. The method of claim 1, wherein performing, by the modem processor, the at least partial checksum processing based on the configuration comprises:
receiving checksum-related data and an uplink packet from the application processor; and
calculating at least a partial checksum for the uplink packet based on the checksum-related data.

15. The method of claim 14, wherein performing, by the modem processor, the at least partial checksum processing based on the configuration comprises:
generating a partial checksum based on an internet protocol (IP) payload of the uplink packet excluding a pseudo header; and
calculating a final checksum based on the partial checksum and at least one of: a pseudo header or pseudo header checksum generated by the application processor.

16. The method of claim 15, wherein:
the checksum-related data comprises at least one of information indicating a location from which the modem processor is to start generating the partial checksum, information indicating a length over which the modem processor is to generate the partial checksum, or a location in which the modem processor is to place the final checksum.

17. The method of claim 15, wherein the modem processor is configured to:
receive a stream of aggregated uplink packets and the checksum-related data; and
perform the at least partial checksum processing for each of the aggregated uplink packets based on the checksum-related data.

18. A method of wireless communication by an application processor of a wireless device, comprising:
configuring a modem processor of the wireless device to perform at least partial checksum processing for packets, wherein the modem processor manages radio functions of the wireless device; and
exchanging uplink and downlink packets with the modem processor, wherein the modem processor performs at least partial checksum processing for at least one of the uplink or downlink packets based on the configuration; and
receiving from the modem processor checksum metadata comprising one or more values indicating at least one of a location within the at least one of the uplink or downlink packets where the modem processor started the at least partial checksum processing.

19. The method of claim 18, wherein the configuration configures the modem processor to perform the at least partial checksum processing on at least one of: a per-packet basis, a per-connection basis, or a per-destination basis.

20. The method of claim 19, wherein the application processor performs the configuration prior to establishing a data call.

21. The method of claim 18, further comprising:
receiving at least a partial checksum from the modem processor; and
performing a checksum verification using the at least a partial checksum.

22. The method of claim 21, further comprising:
updating the at least a partial checksum;
wherein performing a checksum verification using the at least a partial checksum includes calculating a final checksum based on the updated checksum.

23. The method of claim 21, wherein:
the modem processor generates the at least a partial checksum based on an internet protocol (IP) payload of the downlink packet excluding a pseudo header; and
further comprising:
generating the pseudo header; and
calculating a final checksum based on the pseudo header and the at least a partial checksum.

24. The method of claim 23, wherein the application processor is configured to:
receive the checksum metadata from the modem processor for each of a plurality of aggregated downlink packets based on the at least partial checksum processing performed by the modem processor for each of the aggregated downlink packets.

25. The method of claim 18, wherein exchanging uplink and downlink packets with the modem processor comprises:
providing an uplink packet to the modem processor and checksum-related information for the modem processor to use for performing the at least partial checksum processing.

26. The method of claim 25, wherein:
the checksum-related information comprises at least one of information indicating a location from which the modem processor is to start generating at least a partial checksum, information indicating a length over which the modem processor is to generate the at least a partial checksum, or a location in which to place a final checksum.

27. The method of claim 18, wherein exchanging uplink and downlink packets with the modem processor comprises:
providing the modem processor with a stream of aggregated uplink packets and checksum-related information for the modem processor to use for performing the at least partial checksum processing for each of the aggregated uplink packets.

28. The method of claim 18, further comprising:
generating at least one of: a pseudo header or pseudo header checksum for at least one of the packets; and
providing the generated at least one of a pseudo header or pseudo header checksum for at least one of the packets to the modem processor;
wherein the modem processor performs the at least partial checksum processing for at least one of the uplink or downlink packets based on at least one of the pseudo header or pseudo header checksum for at least one of the packets.

29. A method of wireless communication by a user equipment (UE), comprising:
configuring a modem processor of the UE to perform at least partial checksum processing for packets, wherein the modem processor manages radio functions of the UE;
exchanging uplink and downlink packets between an application processor of the UE and the modem processor;
performing, with the modem processor, at least partial checksum processing for at least one of the uplink or downlink packets based on the configuration; and
providing by the modem processor to the application processor checksum metadata comprising one or more values indicating at least one of a location within the at least one of the uplink or downlink packets where the modem processor started the at least partial checksum processing.

30. The method of claim 29, wherein performing the at least partial checksum processing by the modem processor comprises:
calculating at least a partial checksum for a downlink packet received by the UE; and
further comprising providing the checksum metadata by the modem processor to the application processor based on the calculation.

31. The method of claim 30, further comprising:
receiving the at least a partial checksum by the application processor;
updating, by the application processor, the at least a partial checksum;

calculating, by the application processor, a final checksum based on the updated at least a partial checksum; and
verifying the final checksum by the application processor.

32. The method of claim 29, wherein exchanging uplink and downlink packets between the application processor and the modem processor includes providing, by the application processor, an uplink packet to the modem processor and checksum-related data for the modem processor to use for performing the at least partial checksum processing.

33. The method of claim 32, wherein performing, with the modem processor, at least partial checksum processing for at least one of the uplink or downlink packets based on the configuration includes calculating at least a partial checksum for the uplink packet based on the checksum-related data.

34. An apparatus for wireless communications, comprising:
means for exchanging, by a modem processor of the apparatus, uplink and downlink packets with an application processor of the apparatus, wherein the modem processor manages radio functions of the apparatus;
means for performing, by the modem processor, at least partial checksum processing for at least one of the uplink or downlink packets based on a configuration; and
means for providing to the application processor checksum metadata comprising one or more values indicating at least one of a location within the at least one of the uplink or downlink packets where the modem processor started the at least partial checksum processing.

35. The apparatus of claim 34, wherein the configuration configures the modem processor to perform the at least partial checksum processing on at least one of: a per-packet basis, a per-connection basis, or a per-destination basis.

36. The apparatus of claim 34, wherein the configuration is provided to the modem processor by the application processor.

37. The apparatus of claim 36, wherein the application processor provides the configuration prior to establishing a data call.

38. The apparatus of claim 34, wherein the means for performing, by the modem processor, at least partial checksum processing for at least one of the uplink or downlink packets based on a configuration includes means for performing, by the modem processor, at least partial checksum processing for at least one of the uplink or downlink packets based on a configuration using hardware.

39. The apparatus of claim 34, wherein the means for performing the at least partial checksum processing by the modem processor comprises:
means for calculating at least a partial checksum for a downlink packet received by the apparatus; and
means for providing the checksum metadata to the application processor based on the calculation.

40. The apparatus of claim 39, wherein exchanging, by a modem processor, uplink and downlink packets with an application processor comprises providing the downlink packet to the application processor.

41. The apparatus of claim 39, wherein the at least a partial checksum is based on an internet protocol payload of the packet.

42. The apparatus of claim 39, wherein:
the checksum metadata comprises a value of the at least a partial checksum based on which the application processor performs a checksum verification using the at least a partial checksum.

43. The apparatus of claim 42, wherein:
the modem processor generates the value of the at least a partial checksum based on an internet protocol (IP) payload of the downlink packet excluding a pseudo header, based on which along with a pseudo header generated by the application processor, the application processor calculates a final checksum.

44. The apparatus of claim 39, wherein:
the one or more values further indicate at least one a length over which the modem processor calculated the at least a partial checksum or the partial checksum value.

45. The apparatus of claim 39, wherein the modem processor is configured to:
aggregate downlink packets;
perform at least partial checksum processing for each of the aggregated downlink packets; and
provide the checksum metadata to the application processor for each of the aggregated downlink packets based on the at least partial checksum processing performed for each of the aggregated downlink packets.

46. The apparatus of claim 45, wherein the means for performing, by the modem processor, at least partial checksum processing for at least one of the uplink or downlink packets based on a configuration includes means for performing, by the modem processor, at least partial checksum processing for at least one of the uplink or downlink packets based on one or more values included in an aggregation header associated with the packet.

47. The apparatus of claim 34, wherein the means for performing, by the modem processor, the at least partial checksum processing based on the configuration comprises:
means for receiving checksum-related data and an uplink packet from the application processor; and
means for calculating at least a partial checksum for the uplink packet based on the checksum-related data.

48. The apparatus of claim 47, wherein the means for performing, by the modem processor, the at least partial checksum processing based on the configuration comprises:
means for generating a partial checksum based on an internet protocol (IP) payload of the uplink packet excluding a pseudo header; and
means for calculating a final checksum based on the partial checksum and at least one of: a pseudo header or pseudo header checksum generated by the application processor.

49. The apparatus of claim 48, wherein:
the checksum-related data comprises at least one of information indicating a location from which the modem processor is to start generating the partial checksum, information indicating a length over which the modem processor is to generate the partial checksum, or a location in which the modem processor is to place the final checksum.

50. The apparatus of claim 48, wherein the modem processor is configured to:
receive a stream of aggregated uplink packets and the checksum-related data; and
perform the at least partial checksum processing for each of the aggregated uplink packets based on the checksum-related data.

51. An apparatus for wireless communication comprising:
means for configuring a modem processor of the apparatus to perform at least partial checksum processing for packets, wherein the modem processor manages radio functions of the apparatus;
means for exchanging uplink and downlink packets between an application processor of the apparatus and the modem processor, wherein the modem processor performs at least partial checksum processing for at least one of the uplink or downlink packets based on the configuration; and
means for receiving from the modem processor checksum metadata comprising one or more values indicating at least one of a location within the at least one of the uplink or downlink packets where the modem processor started the at least partial checksum processing.

52. The apparatus of claim 51, wherein the configuration configures the modem processor to perform the at least partial checksum processing on at least one of: a per-packet basis, a per-connection basis, or a per-destination basis.

53. The apparatus of claim 52, wherein the means for configuring the modem processor performs the configuration prior to establishing a data call.

54. The apparatus of claim 51, further comprising:
means for receiving at least a partial checksum from the modem processor; and
means for performing a checksum verification using the at least a partial checksum.

55. The apparatus of claim 54, further comprising:
means for updating the at least a partial checksum;
wherein the means for performing a checksum verification using the at least a partial checksum includes means for calculating a final checksum based on the updated checksum.

56. The apparatus of claim 54, wherein:
the modem processor generates the at least a partial checksum based on an internet protocol (IP) payload of a downlink packet excluding a pseudo header; and
further comprising:
means for generating the pseudo header; and
means for calculating a final checksum based on the pseudo header and the at least a partial checksum.

57. The apparatus of claim 56, further comprising:
means for receiving the checksum metadata from the modem processor for each of a plurality of aggregated downlink packets based on the at least partial checksum processing performed by the modem processor for each of the aggregated downlink packets.

58. The apparatus of claim 51, wherein the means for exchanging uplink and downlink packets with the modem processor comprises:
means for providing an uplink packet to the modem processor and checksum-related information for the modem processor to use for performing the at least partial checksum processing.

59. The apparatus of claim 58, wherein:
the checksum-related information comprises at least one of information indicating a location from which the modem processor is to start generating at least a partial checksum, information indicating a length over which the modem processor is to generate the at least a partial checksum, or a location in which to place a final checksum.

60. The apparatus of claim 51, wherein the means for exchanging uplink and downlink packets with the modem processor comprises:
means for providing the modem processor with a stream of aggregated uplink packets and checksum-related information for the modem processor to use for performing the at least partial checksum processing for each of the aggregated uplink packets.

61. The apparatus of claim 51 further comprising:
means for generating at least one of: a pseudo header or pseudo header checksum for at least one of the packets; and
means for providing the generated at least one of a pseudo header or pseudo header checksum for at least one of the packets to the modem processor;
wherein the modem processor performs the at least partial checksum processing for at least one of the uplink or downlink packets based on at least one of the pseudo header or pseudo header checksum for at least one of the packets.

62. An apparatus for wireless communication, comprising:
means for configuring a modem processor of the apparatus to perform at least partial checksum processing for packets wherein the modem processor manages radio functions of the apparatus;
means for exchanging uplink and downlink packets between an application processor of the apparatus and the modem processor;
means for performing, with the modem processor, at least partial checksum processing for at least one of the uplink or downlink packets based on the configuration; and
means for providing by the modem processor to the application processor checksum metadata comprising one or more values indicating at least one of a location within the at least one of the uplink or downlink packets where the modem processor started the at least partial checksum processing.

63. The apparatus of claim 62, wherein the means for performing, with the modem processor, the at least partial checksum processing comprises:
means for calculating at least a partial checksum for a downlink packet received by the apparatus; and
further comprising means for providing the checksum metadata by the modem processor to the application processor based on the calculation.

64. The apparatus of claim 63, further comprising:
means for receiving the at least a partial checksum by the application processor;
means for updating, by the application processor, the at least a partial checksum;
means for calculating, by the application processor, a final checksum based on the updated at least a partial checksum; and
means for verifying the final checksum by the application processor.

65. The apparatus of claim 62, wherein the means for exchanging uplink and downlink packets between the application processor and the modem processor includes means for providing, by the application processor, an uplink packet to the modem processor and checksum-related data for the modem processor to use for performing the at least partial checksum processing.

66. The apparatus of claim 65, wherein the means for performing, with the modem processor, at least partial checksum processing for at least one of the uplink or downlink packets based on the configuration includes means for calculating at least a partial checksum for the uplink packet based on the checksum-related data.

67. An apparatus for wireless communications, comprising:
at least one modem processor configured to exchange uplink and downlink packets with an application processor of the apparatus, perform at least partial checksum processing for at least one of the uplink or downlink packets based on a configuration, and provide to the application processor checksum metadata comprising one or more values indicating at least one of a location within the at least one of the uplink or downlink packets where the modem processor started the at least partial checksum processing, wherein the modem processor manages radio functions of the apparatus; and
a memory coupled with the at least one modem processor.

68. The apparatus of claim 67, wherein the configuration configures the at least one modem processor to perform the at least partial checksum processing on at least one of: a per-packet basis, a per-connection basis, or a per-destination basis.

69. The apparatus of claim 67, wherein the configuration is provided to the at least one modem processor by the application processor.

70. An apparatus for wireless communication, comprising:
at least one application processor configured to configure a modem processor of the apparatus to perform at least partial checksum processing for packets, exchange uplink and downlink packets with the modem processor, wherein the modem processor performs the at least partial checksum processing for at least one of the uplink or downlink packets based on the configuration, and receive from the modem processor checksum metadata comprising one or more values indicating at least one of a location within the at least one of the uplink or downlink packets where the modem processor started the at least partial checksum processing, wherein the modem processor manages radio functions of the apparatus; and
a memory coupled with the at least one application processor.

71. The apparatus of claim 70, wherein the configuration configures the modem processor to perform the at least partial checksum processing on at least one of: a per-packet basis, a per-connection basis, or a per-destination basis.

72. The apparatus of claim 71, wherein the at least one application processor performs the configuration prior to establishing a data call.

73. An apparatus for wireless communication, comprising:
at least one application processor coupled with at least one modem processor of the apparatus, wherein the modem processor manages radio functions of the apparatus;
the at least one application processor configured to configure the at least one modem processor to perform at least partial checksum processing for packets, exchange uplink and downlink packets between the at least one application processor and the at least one modem processor; and
the at least one modem processor configured to:
perform the at least partial checksum processing for at least one of the uplink or downlink packets based on the configuration; and
provide to the application processor checksum metadata comprising one or more values indicating at least one of a location within the at least one of the uplink or downlink packets where the modem processor started the at least partial checksum processing; and
a memory coupled with the at least one processor.

74. The apparatus of claim 73, wherein the at least one modem processor is further configured to:
  calculate at least a partial checksum for a downlink packet received by the apparatus; and
  provide the checksum metadata to the at least one application processor based on the calculation.

75. The apparatus of claim 74, wherein the at least one application processor is further configured to:
  receive the at least a partial checksum;
  update the at least a partial checksum;
  calculate a final checksum based on the updated at least a partial checksum; and
  verify the final checksum.

76. A computer program product for wireless communications, comprising a non-transitory computer readable medium having instructions stored thereon for:
  exchanging, by a modem processor of a wireless device, uplink and downlink packets with an application processor of the wireless device, wherein the modem processor manages radio functions of the wireless device; and
  performing, by the modem processor, at least partial checksum processing for at least one of the uplink or downlink packets based on a configuration; and
  providing to the application processor checksum metadata comprising one or more values indicating at least one of a location within the at least one of the uplink or downlink packets where the modem processor started the at least partial checksum processing.

77. The computer program product of claim 76, wherein the configuration configures the modem processor to perform the at least partial checksum processing on at least one of: a per-packet basis, a per-connection basis, or a per-destination basis.

78. The computer program product of claim 76, wherein the configuration is provided to the modem processor by the application processor.

79. A computer program product for wireless communication by an application processor of a wireless device, comprising a non-transitory computer readable medium having instructions stored thereon for:
  configuring a modem processor of the wireless device to perform at least partial checksum processing for packets, wherein the modem processor manages radio functions of the wireless device;
  exchanging uplink and downlink packets with the modem processor, wherein the modem processor performs at least partial checksum processing for at least one of the uplink or downlink packets based on the configuration; and
  receiving from the modem processor checksum metadata comprising one or more values indicating at least one of a location within the at least one of the uplink or downlink packets where the modem processor started the at least partial checksum processing.

80. The computer program product of claim 79, wherein the configuration configures the modem processor to perform the at least partial checksum processing on at least one of: a per-packet basis, a per-connection basis, or a per-destination basis.

81. The computer program product of claim 80, wherein the application processor performs the configuration prior to establishing a data call.

82. A computer program product for wireless communication by a user equipment (UE), comprising a non-transitory computer readable medium having instructions stored thereon for:
  configuring a modem processor of the UE to perform at least partial checksum processing for packets, wherein the modem processor manages radio functions of the UE;
  exchanging uplink and downlink packets between an application processor of the UE and the modem processor;
  performing, with the modem processor, at least partial checksum processing for at least one of the uplink or downlink packets with the modem processor based on the configuration; and
  providing by the modem processor to the application processor checksum metadata comprising one or more values indicating at least one of a location within the at least one of the uplink or downlink packets where the modem processor started the at least partial checksum processing.

83. The computer program product of claim 82, wherein performing, with the modem processor, the at least partial checksum processing comprises:
  calculating at least a partial checksum for a downlink packet received by the UE; and
  further comprises providing the checksum metadata by the modem processor to the application processor based on the calculation.

84. The computer program product of claim 83, further comprising instructions for:
  receiving the at least a partial checksum;
  updating the at least a partial checksum;
  calculating a final checksum based on the updated at least a partial checksum; and
  verifying the final checksum.

* * * * *